United States Patent
Baba et al.

(10) Patent No.: US 9,231,513 B2
(45) Date of Patent: Jan. 5, 2016

(54) ELECTRIC MOTOR SYSTEM

(75) Inventors: Tsutomu Baba, Fujisawa (JP); Kenji Fujiwara, Fujisawa (JP)

(73) Assignee: Moog Japan Ltd., Hiratsuka (JP)

( * ) Notice: Subject to any disclaimer, the term of this patent is extended or adjusted under 35 U.S.C. 154(b) by 1019 days.

(21) Appl. No.: 13/259,616

(22) PCT Filed: Mar. 24, 2010

(86) PCT No.: PCT/JP2010/055784
§ 371 (c)(1),
(2), (4) Date: Apr. 16, 2012

(87) PCT Pub. No.: WO2010/110483
PCT Pub. Date: Sep. 30, 2010

(65) Prior Publication Data
US 2012/0187893 A1   Jul. 26, 2012

(30) Foreign Application Priority Data
Mar. 25, 2009 (JP) ................................ 2009-073000

(51) Int. Cl.
H02P 23/00 (2006.01)
H02P 25/02 (2006.01)
H02P 25/22 (2006.01)

(52) U.S. Cl.
CPC .............. *H02P 25/021* (2013.01); *H02P 25/22* (2013.01)

(58) Field of Classification Search
CPC ............. H02P 25/22; H02P 6/08; H02P 6/16; H02P 6/182; H02K 3/28

USPC .......................................................... 318/722
See application file for complete search history.

(56) References Cited

U.S. PATENT DOCUMENTS

| | | | |
|---|---|---|---|
| 4,392,099 A * | 7/1983 | Kuniyoshi | 318/797 |
| 6,400,107 B1 * | 6/2002 | Nakatani et al. | 318/400.21 |
| 2004/0062062 A1 * | 4/2004 | Lee et al. | 363/37 |
| 2006/0022544 A1 * | 2/2006 | Kinashi | 310/179 |
| 2008/0116770 A1 * | 5/2008 | Lewis | 310/68 D |
| 2010/0002744 A1 * | 1/2010 | Sheahan | 374/1 |

* cited by examiner

Primary Examiner — Eduardo Colon Santana
Assistant Examiner — Gabriel Agared
(74) Attorney, Agent, or Firm — Phillips Lytle LLP (57) ABSTRACT

An electric motor system including: a rotor (9); a stator (8); the rotor and the stator being mounted for movement relative to one another; the rotor having multiple magnetic poles (11); the stator having multiple salient poles (12) facing the magnetic poles; a first coil set (1A) and a second coil set (1B); the first coil set having three phases, each of the phases comprising a first coil (u1, v1, w1) and a second coil (u1 v1', w1') connected in series and wrapped around different of the salient poles in different directions relative to the rotor; the second coil set having three phases, each of the phases comprising a first coil (u2, v2, w2) and a second coil (u2', v2', w2') connected in series and wrapped around different of the salient poles in different directions relative to the rotor; a driver (2) configured to drive the first coil set with a first three-phase voltage (U1, V1, W1) and to drive the second coil set with a second three-phase voltage (U2, V2, W2); the driver configured to drive the first phase of the first three-phase voltage and the first phase of the second three-phase voltage with a relative phase shift.

19 Claims, 8 Drawing Sheets

ELECTRIC MOTOR SYSTEM

TECHNICAL FIELD

The present invention relates generally to electric motor systems and, more particularly, to electric motor systems having a rotor with at least one permanent magnet, a stator with salient poles, a plurality of multi-phase coil sets with coils wound on salient poles of the stator, and a driver for supplying a plurality of multi-phase electric currents.

BACKGROUND ART

Recently, the appearance of powerful rare-earth magnets on the market has enabled the development of small, high efficiency, high power permanent magnet-type synchronous motors that use rare-earth magnets in the rotors. These motors are used as motive sources and control driver sources in a variety of industries. In order to use such motors at high power, there have been increases in the electric current capacities of inverters for motors.

Figure 7:
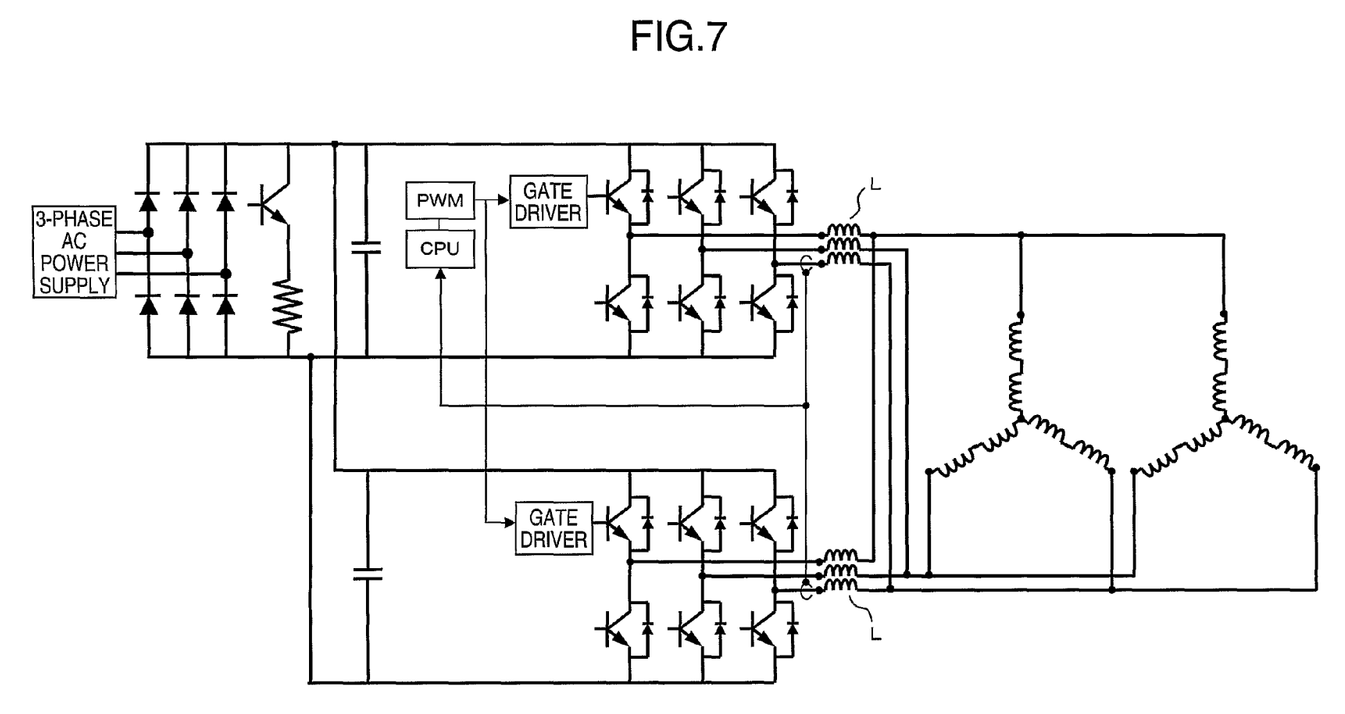
FIG. 7 is a prior art conventional electric motor system.

One example of a conventional electric motor system is illustrated in FIG. 7. This electric motor system has two three-phase coil sets with distributed windings with branched connections, and two inverters, connected in series with the individual coils. Each of the inverters is provided with six insulated gate bipolar transistors (IGBTs) that are in complementary connection. The respective IGBTs are driven by gate drivers controlled using a PWM method, to provide three-phase AC power from the IGBTs through electric current parallel reactors L to the two coils of the electric motor. Another inverter is structured in the same manner, to drive in parallel, through two inverters, the respective three-phase coil sets that are connected in parallel. That is, in an electric motor with this type of structure, two inverters are connected in parallel to two three-phase coil sets. In this type of structure, an electric current parallel reactor L is indispensable for mitigating imbalance between the respective electric currents from the two inverters.

Figure 8:
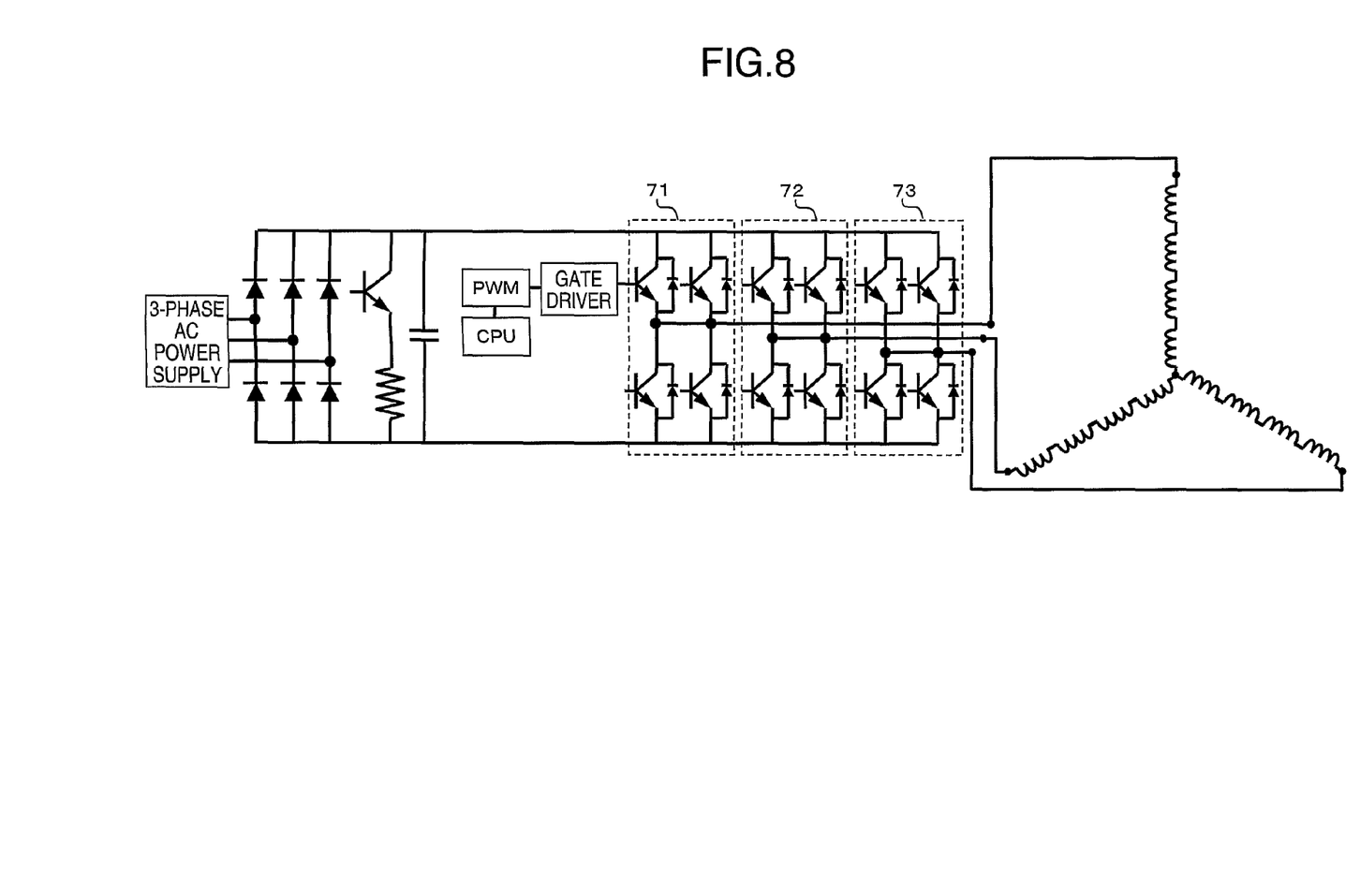
FIG. 8 is an alternate prior art conventional electric motor system.

FIG. 8 illustrates another conventional electric motor system. This electric motor system has an electric motor having a single three-phase coil set that has a branched connection, and inverters 71, 72, and 73, that have IGBTs that are connected in parallel. This electric motor system enables the supply of a large electric current through connecting in parallel relatively inexpensive below-current IGBTs. However, because the IGBTs are connected in parallel, balancing the electric current between the IGBTs is difficult, and typically it is necessary to have circuit designs that take into account a derating of between 10 and 30% (as it is necessary to use a device that has a rating that has a margin relative to the power use). Because of this, it is necessary to use IGBTs that have large rated powers relative to the maximum electric current values required by the electric motor, increasing the cost of manufacturing the inverters.

Japanese Patent Application Publication JP-A-9-331694 discloses an induction motor wherein a high number of multiply split coils are formed by splitting coils for each phase, and multiple inverter primary circuits that are capable of applying multi-phase alternating current power individually to the split multi-phase coils are provided. This motor provides a high power inverter motor without requiring high power switching elements, which are relatively expensive when compared to low power ones.

Japanese Patent Application Publication JP-A-7-298685 discloses a system for driving a 6-phase induction motor using two three-phase PWM inverters. The 6-phase induction motor has six phase coils u1, y1, w1, x1, v1, and z1, where the coils u1, w1, and v1 form a three-phase winding W1, and the coils y1, x1, and z1 form a three-phase winding W2. The two three-phase PWM inverters produce voltages with waveforms with a 180° phase difference, which are connected to the respective three-phase windings W1 and W2. Thus a high power driving system is disclosed that provides either an in-phase or anti-phase symmetrical voltage waveform to each winding, where two different windings are connected to multiple inverters by forming a six-phase induction motor wherein the windings that are formed on opposing poles for a single phase in a three-phase induction motor are separated.

Japanese Patent Application Publication JP-A-2004-64893 discloses an induction motor wherein two three-phase inverters and two three-phase windings are respectively split and connected. The phases of the two three-phase inverters are 180° out of phase with each other.

Japanese Patent Application Publication JP-A-2006-203957 discloses an induction motor wherein two three-phase inverters and two three-phase windings are each split and connected. A single coil is connected to each phase, where coils that structure single three-phase connections are disposed at 120° angles on the stator, and two three-phase connections are disposed shifted 60° from each other. Two three-phase inverters of an identical phase provide power to the respective three-phase connections.

However, the motors disclosed in the references described above are induction motors, and thus have fundamentally different structures from synchronous motors that use permanent magnets in the rotors.

SUMMARY OF THE INVENTION

With parenthetical reference to the corresponding parts, portions or surfaces of the disclosed embodiment, merely for purposes of illustration and not by way of limitation, the present invention broadly provides an improved electric motor system comprising: a rotor (9); a stator (8); the rotor and the stator being mounted for movement relative to one another; the rotor having multiple magnetic poles (11); the stator having multiple salient poles (12) facing the magnetic poles; a first coil set (1A) and a second coil set (1B); the first coil set having three phases, each of the phases comprising a first coil (u1, v1, w1) and a second coil (u1', v1', w1') connected in series and wrapped around different of the salient poles in different directions relative to the rotor; the second coil set having three phases, each of the phases comprising a first coil (u2, v2, w2) and a second coil (u2', v2', w2') connected in series and wrapped around different of the salient poles in different directions relative to the rotor; a driver (2) configured to drive the first coil set with a first three-phase voltage (U1, V1, W1) and to drive the second coil set with a second three-phase voltage (U2, V2, W2); the driver configured to drive the first phase of the first three-phase voltage and the first phase of the second three-phase voltage with a relative phase shift.

The phase shift may be 30 degrees. The coils may be wrapped around adjacent salient poles and configured with the driver such that the adjacent salient poles have a relative magnetic flux phase shift of about 210 degrees. The first coil (u1) of the first phase of the first coil set (1A) and the second coil (u2') of the first phase of the second coil set (1B) are wrapped around adjacent salient poles and in different directions relative to the rotor such that the adjacent salient poles have a relative magnetic flux phase shift of about 210 degrees. The number of magnetic poles may be 14×n and the number of salient poles may be 12×n, where n is a positive integer, or the number of magnetic poles may be 10×n and the number of salient poles may be 12×n, where n is a positive integer. The first coil of the first phase of the first coil set and the second coil of the first phase of the second coil set may be wrapped around adjacent salient poles in different directions relative to the rotor.

The magnetic poles may be formed on a surface of the rotor. The magnetic poles may be embedded in the rotor. The first coil set and the second coil set may be connected to the driver independently of each other. The stator and the rotor may be mounted for rotational movement relative to one another about a common axis. The driver may comprise a plurality of insulated gate bipolar transistors (511-515), an AC to DC inverter (3) which is made up of an AC to DC rectifier (3A), a rectifying capacitor (41), a CPU (611), a pulse-width-modulation module (612), and a gate driver (613). The system may further comprise a current sensor in communication with the CPU arranged to measure a current flow in an output line of the driver. The driver may not include a reactor (L) on one of its output lines. The integer n may be 1 or 2. The system may further comprise a third coil set (1C) and a fourth coil set (1D). The driver may comprise six IGBTs arranged to produce the first three-phase voltage.

In another aspect, the invention is directed to a electric motor system comprising: a rotor (9); a plurality of magnetic poles (11) on the outer periphery of the rotor (9); a stator (8) encompassing the rotor (9); a plurality of salient poles (12) formed on the inner periphery of the stator (8); multiple independently connected three-phase coil sets (1A, 1B); and a controlling means (2). Each phase (e.g. u) has a first coil (u1) and a second coil (u1') which are connected in series, but are wrapped in mutually opposite directions on different salient poles. The controlling means (2) provides at least two different three-phase electric currents (U1, V1, W1; U2, V2, W2) having different phases to the multiple three-phase coil sets (1A, 1B). The controlling means (20) includes control units (61, 62, 63, 64) and inverter units (51, 52, 53, 54).

One embodiment of the electric motor system is characterized by the number of magnetic poles being 14×n and the number of salient poles being 12×n, where n is a positive integer.

Another embodiment of the electric motor system is characterized by the number of magnetic poles being 10×n and the number of salient poles being 12×n, where n is a positive integer.

Yet another embodiment of the electric motor system is characterized by the controlling means providing, to multiple three-phase coil sets, two types of three-phase electric power having a mutual phase difference of 30°, where an adjacent coil that is supplied power with a phase that is different by 30° is wound in the opposite direction.

Yet another embodiment of the electric motor system is characterized by the magnetic poles being formed on the surface of a rotor.

Yet another embodiment of the electric motor system is characterized by the magnetic poles being embedded in a rotor.

Thus several advantages of one or more aspects are to provide a high power, high efficiency electric motor system without increasing the power of the switching elements, such as IGBTs, used in the inverter, and to reduce the size and the manufacturing costs of the electric motor system. These and other advantages of one or more aspects will become apparent from a consideration of the ensuing description and accompanying drawings.

DESCRIPTION OF EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
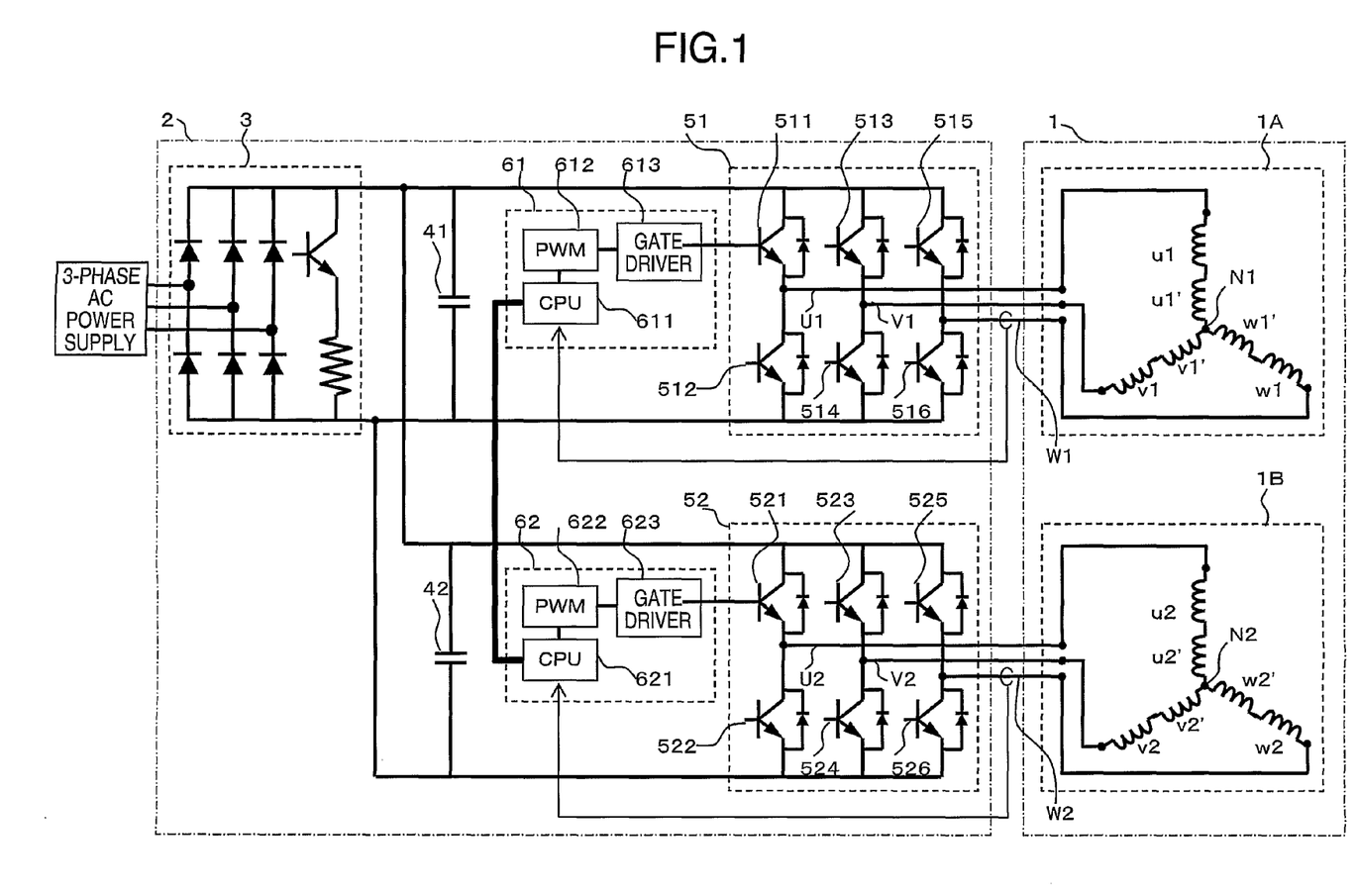
FIG. 1 is a diagram illustrating a first embodiment of the invention.

FIG. 1 illustrates a first embodiment of the electric motor system. As shown, the electric motor system broadly comprises electric motor 1 and driving circuit 2. Electric motor 1 has stator 8 and rotor 9. Two three phase coil sets, 1A and 1B, are wound around poles 12 of stator 8. Rotor 9 has permanent magnets 11. Driving circuit 2 produces two three-phase driving voltages for driving electric motor 1.

Driving circuit 2 contains converter unit 3 (for converting three-phase alternating current power source 5 into direct current), rectifying capacitors 41 and 42, control units 61 and 62 (for generating respective three-phase PWM signals), and first and second inverter units 51 and 52 (for converting the direct current into the desired alternating current through switching operations as controlled by control units 61 and 62).

Control unit 61 provides inverter unit 51 the proper switch signals to generate three-phase driving voltages U1, W1, and V1 at the proper frequency and phase. Control unit 61 comprises CPU 611, PWM circuit 612, and gate driver 613. CPU 611 provides signals to PWM circuit 612, which generates a three-phase PWM signal based on the calculation results of CPU 611. Gate inverter 613 performs current amplification of the PWM signal provided to it from PWM circuit 612. CPU 611 is provided with a memory into which a predetermined control program is written, a calculating unit, and an interrupt port for inputting a sensor value measuring the driving voltage W1. Using the driving voltage W1 as a reference, CPU 611 is able to control the generation of driving voltages U1 and V1 with precise phase differences. PWM circuit 612 generates a three-phase PWM signal based on the calculation results by CPU 611. Gate driver 613 performs current amplification of the three-phase PWM signal as well as an inverse PWM signal, and outputs them to the inverter unit 51.

Control unit 62 is structured identically to control unit 61. However, CPU's 611 and 621 are synchronized to generate driving signals with a desired phase difference between first and second inverter units 51 and 52 through synchronized calculations. Control units 61 and 62 may alternatively be controlled through a shared CPU. Furthermore, control such as PAM (Pulse Amplitude Modulation) may be used instead of PWM control.

First inverter 51 is structured from IGBTs 511 and 512 for the U1 phase, IGBTs 513 and 514 for the V1 phase, and IGBTs 515 and 516 for the W1 phase. Each of the pairs of IGBTs are connected in series between the direct current positive output and the direct current negative output of converter unit 3. The gates of IGBP's 511 through 516 are connected to gate driver 613, and switching operations are performed by a three-phase pulse signal. The two IGBTs for a given phase, for example IGBTs 511 and 512 for phase U1, are driven by gate signals that are mutual inverses of each other. Doing so produces the proper driving voltage U1, at the emitter of IGBT 511 and the collector of IGBT 512. The driving voltage V1 is outputted similarly from IGBTs 513 and 514, and the driving voltage W1 is outputted similarly from IGBTs 515 and 516.

As will be described below, three-phase driving voltages U1, V1, and W1 have phase differences of 120° from each other. Second inverter unit 52 is also structured with six IGBTs 521 through 526, in the same manner as first inverter unit 51, and outputs three-phase driving voltages U2, V2, and W2. Additionally, it is noted that while IGBTs are used in this embodiment as the switching elements for first and second inverter units 51 and 52, different switching element types, such as power MOSFETs, bipolar transistors, and the like, may be used instead.

Three-phase driving voltages U1, V1, and W1 are supplied from inverter unit 51 to three-phase coil set 1A of electric motor 1, and three-phase driving voltages U2, V2, and W2 are provided from inverter unit 52 to three-phase coil set 1B. Three-phase coil sets 1A and 1B are connected independently of each other, and are driven by individual inverter units 51 and 52, respectively.

As illustrated in FIG. 1, first three-phase coil set 1A is structured from coils u1, u1', v1, v1', w1, and w1', and is branch-connected centered on node N1. Respective coil pairs are connected in series. For example, coils u1 and u1' are connected in series. Similarly, coils v1 and v1', and coils w1 and w1' are also connected in series. Driving voltage U1 is applied to the end of coil u1 as shown in FIG. 1. Similarly, driving voltage V1 is applied to coil v1, and driving voltage W1 is applied to coil w1. Similarly, second three-phase coil set 1B is also branch-connected, centered on node N2. As shown in FIG. 1, three-phase driving voltages U2, V2, and W2 are applied to coils u2, v2, and w2.

Figure 2:
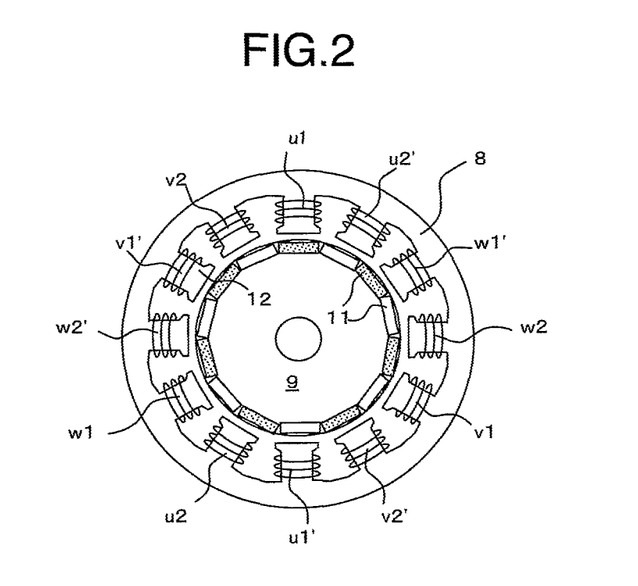
FIG. 2 is a cross-sectional view of the 14-pole, 12-slot electric motor of the first embodiment.

FIG. 2 illustrates a cross-section of the electric motor 1 of the first embodiment. Electric motor 1 is a 14-pole/12-slot surface permanent magnet synchronous electric motor. There are 14 permanent magnets 11 of alternating polarities provided on the outer periphery of rotor 9. There are 12 salient poles 12 on the inner periphery of stator 8, protruding towards the center of rotation of rotor 9. Salient poles 12 are arranged at 30° intervals.

Each coil u1, u2', w1', w2, v1, v2', u1', u2, w1, w2', v1', and v2 is wrapped onto its own salient pole as shown in FIG. 2. Additionally, coils u1, v1, w1, u2, v2, and w2 have winding directions that are the same as each other, and opposite from coils u1', v1', w1', u2', v2', and w2'. Because of this, the magnetic field vector that is generated in each of the aforementioned coil pairs (such as coils u1 and u1') are of opposite polarities relative to rotor 9's center of rotation. By sequentially winding the same wire onto different salient poles in different directions, it is possible to obtain magnetic forces having a 180° phase difference from a single driving current. As shown in FIG. 2, the winding direction of the coil alternates every two sets of slots moving clockwise around the stator. For example, coils v2 and u1 are wound in the same direction, which is opposite from coils u2' and w1'.

In the 14-pole, 12-slot electric motor system of the first embodiment, the electric angles of adjacent salient poles are 210° (14×180°/12) from each other. That is, there is a 210° difference between the phases of magnetic fluxes that are produced by adjacent coils.

Figure 3:
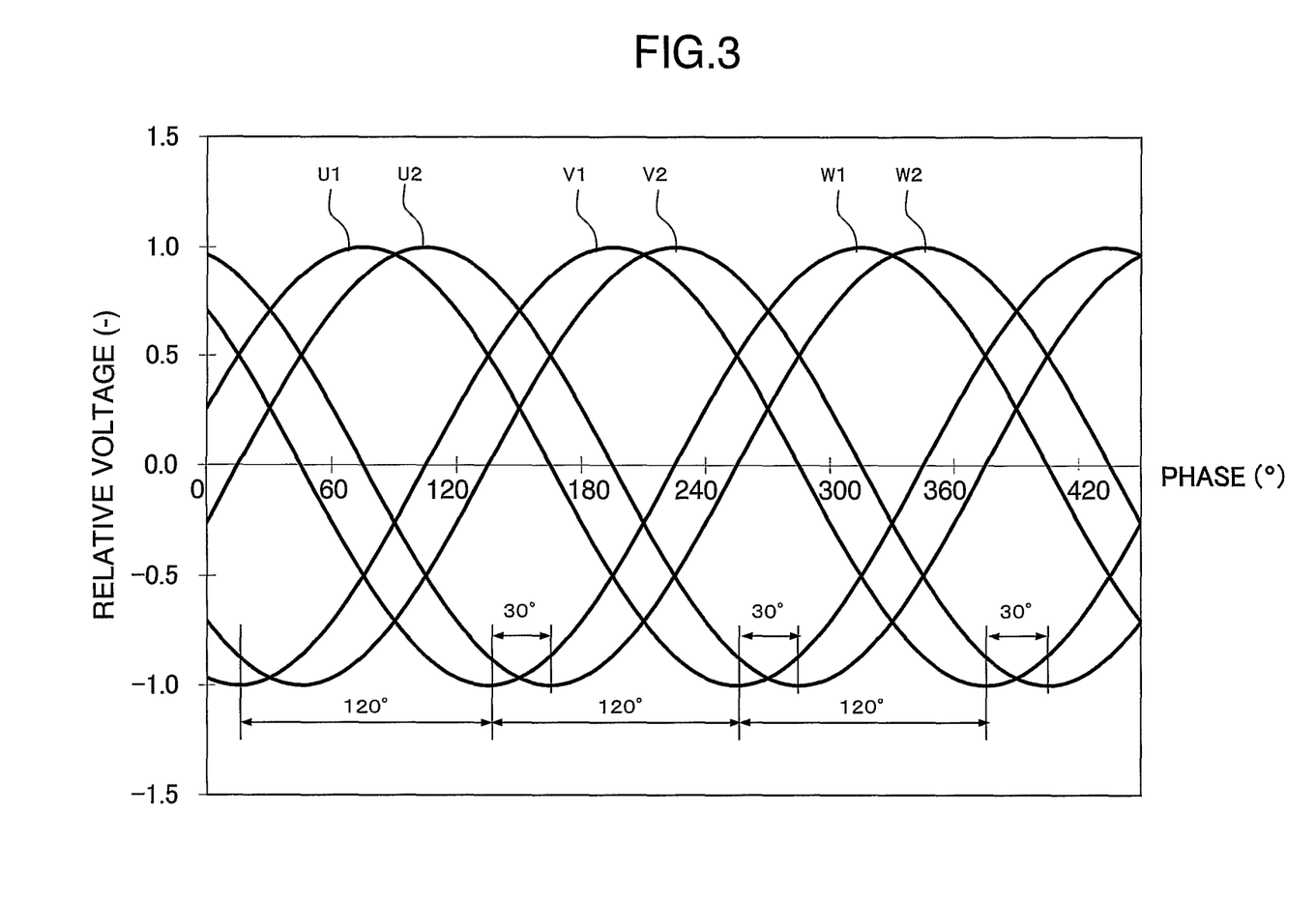
FIG. 3 is a graph illustrating the phases of the driving voltage of the first embodiment.

FIG. 3 illustrates the phases of the three-phase driving voltages in the first embodiment. The horizontal axis of FIG. 3 indicates the phase of the driving voltage, and the vertical axis indicates the driving voltage (the relative voltages). Driving voltages U1, V1, and W1 from first inverter unit 51 have, respectively, 0°, 120°, and 240° phase differences when using driving voltage U1 as the reference. Furthermore, driving voltages U2, V2, and W2 from second inverter unit 52 have phase differences of 30°, 150°, and 270°, respectively, when using driving voltage U1 as the reference. Consequently, as illustrated in FIG. 3, driving voltages U1, V1, and W1 from first inverter unit 51 and driving voltages U2, V2, and W2 from second inverter unit 52 have a 30° phase difference from each other, respectively. For example, U1 and U2 are separated 30° in phase, with U2 being 30° earlier than U1.

Adjacent coils have a magnetic flux difference that is a result of a phase difference in their driving voltages, and possibly an added phase difference if the coils are wound in opposite directions. Referring to FIGS. 1-3 in unison, it will be described how each coil is driven with a voltage that causes its resulting magnetic flux to have a phase delay of 210° relative to the next clockwise coil. For example, the phase of the magnetic flux of coil u1 is 210° later than the phase of the magnetic flux of coil u2', and similarly, the magnetic flux phase of coil u2' is 210° later than coil w1'.

Coil u1 is driven by driving voltage U1. Coil u2' is driven by driving voltage U2. As shown in FIG. 3, driving voltage U2 is leading driving voltage U1 by 30°. In other words, U1 has a phase delay of 30° relative to U2. As shown in FIG. 2 and described earlier, coils u1 and u2' are wound in opposite directions around their respective slots. The opposite winding direction causes an opposite magnetic flux to be generated in the coils given an identical driving voltage. The effect of opposite winding directions is equivalent to a phase difference of 180°. The 30° phase delay between the driving voltages, combined with a 180° phase difference due to opposite winding directions, causes coils u1 and u2' to have a 210° phase difference in their magnetic flux (u1 being delayed by 210° relative to u2').

The phase difference between coil u2' and coil w1' is also 210°. However, the origination of the delay is slightly different. Since coils u2' and w1' are both "prime" coils, their windings are in the same direction. Thus, there is no relative magnetic flux phase shift due to winding direction. However, referring to FIG. 3, it can be seen that driving voltage U2 and driving voltage W1 have a phase difference of 210° and U2 is 210° delayed relative to W1. The 210° driving voltage delay directly results in a 210° magnetic flux delay between coils u2' and w1'.

The pattern of adjacent coils having either a 30° driving voltage shift and a winding reversal, or a 210° driving voltage shift and no winding reversal, repeats clockwise around the stator. For example, the 30° driving voltage phase shift and opposite winding directions is observed between the adjacent coil pairs: u1 and u2; w1' and w2; v1 and v2; u1' and u2; w1 and w2'; and v1' and v2. Alternatively, the 210° driving voltage shift and same direction windings are found in the adjacent coil pairs: u2' and w1'; w2 and v1; v2' and u1; u2 and w1; w2' and v1'; and v2 and u1. This pattern produces the effect that any two adjacent coil pairs will have a magnetic flux phase shift of 210°. Referring to FIG. 2, each subsequent coil in the clockwise direction around the rotor has an increasing magnetic flux phase shift of 210° more than the previous coil. For example, coil u2' has a magnetic flux phase shift of 210° relative to coil u1, coil w1' has a magnetic flux phase shift of 420° (420°−360°=60°) relative to u1, w2 has a phase shift of 630° (630°−360°=270°) relative to u1, v1 has a phase shift of 840° (840°−360°=120°) relative to u1.

By having two three-phase driving power supplies that have a relative phase difference of 30° as described, it is possible to produce electric angles that are 210° different between adjacent coils for each of the 12 coils. This enables synchronized driving of the 14-pole, 12-slot electric motor as set forth in the first embodiment.

Furthermore, in this embodiment, since not only are the electric currents nearly identical phases (electric currents wherein the phases are different by 30°) as applied to adjacent coils u1 and u2', but also the coils are wound in opposite directions, the magnetic coupling between adjacent coils is strong. For example, when there is a large electric current in coil u1 the induced magnetic field lines will flow through the armature and into coil u2', reinforcing the magnetic flux generated by coil u2'. The result is that the strong magnetic coupling between adjacent arms makes it possible to achieve increased flux density and thus increased motor performance. In contrast, in the case of typical distributed winding structures, the magnetic coupling between adjacent coils is weak.

Typically, in an electric motor with distributed windings, wherein the coils are wound bridging multiple slots, the winding wires that are wound onto another slot would have to go around to the tip portion of the salient pole, and thus when compared to an electric motor with concentrated windings wherein the coils are wound onto a single salient pole, the length of the coils are longer by the length of the wiring to the coil end portions of the stator. Furthermore, because, in the distributed windings, the winding wire that is wound in another slot at the end portion of the salient pole wraps around and is layered, so, when compared to the case of the concentrated windings, the coil end portions of the stator are fatter. In the electric motor system as set forth in the present invention, the coils are wound as concentrated windings, and so it is possible to reduce the thickness of the coil end portion of the stator, enabling the coil portion to have a compact design. Additionally, the resistance of the winding wires can be reduced because the length of the winding wires is reduced through the concentrated windings, and thus there is the benefit of being able to reduce the size of the driving circuit.

Additionally, the three-phase coil sets 1A and 1B are connected independently (no direct electrical connection between them), and are driven by different inverter units 51 and 52, respectively, making balancing reactors L (such as used in the prior art shown in FIG. 7) unnecessary. Furthermore, since a single IGBT handles only a single phase, it is possible to design the driving circuit without derating the IGBTs. This makes it possible to reduce the size of the driving circuitry, with the effect of being able to reduce the manufacturing cost of the electric motor system.

Figure 4:
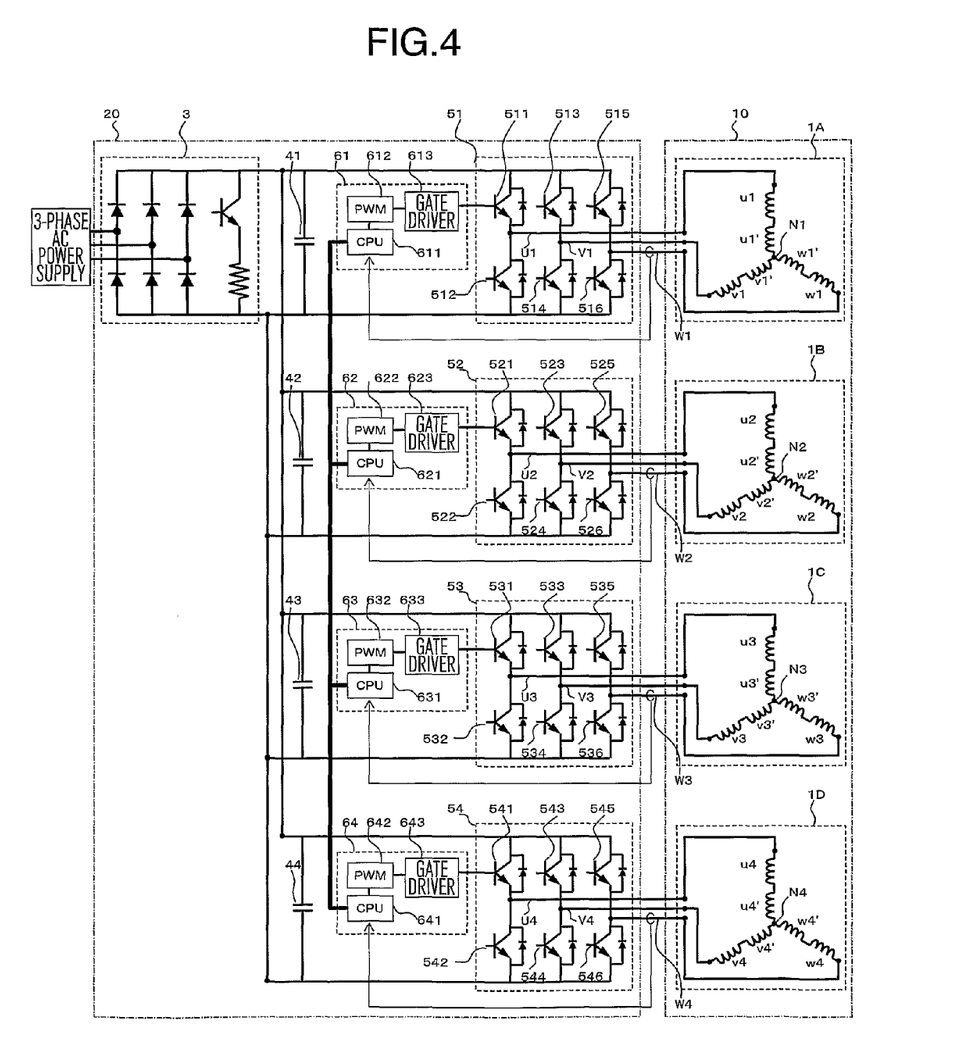
FIG. 4 is a diagram illustrating a second embodiment of the invention.
Figure 5:
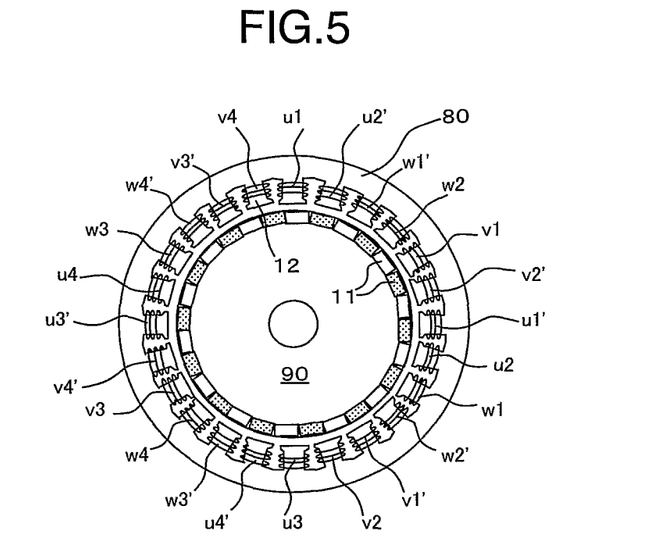
FIG. 5 is a cross-sectional view of the 28-pole, 24-slot electric motor of the second embodiment.
Figure 6:
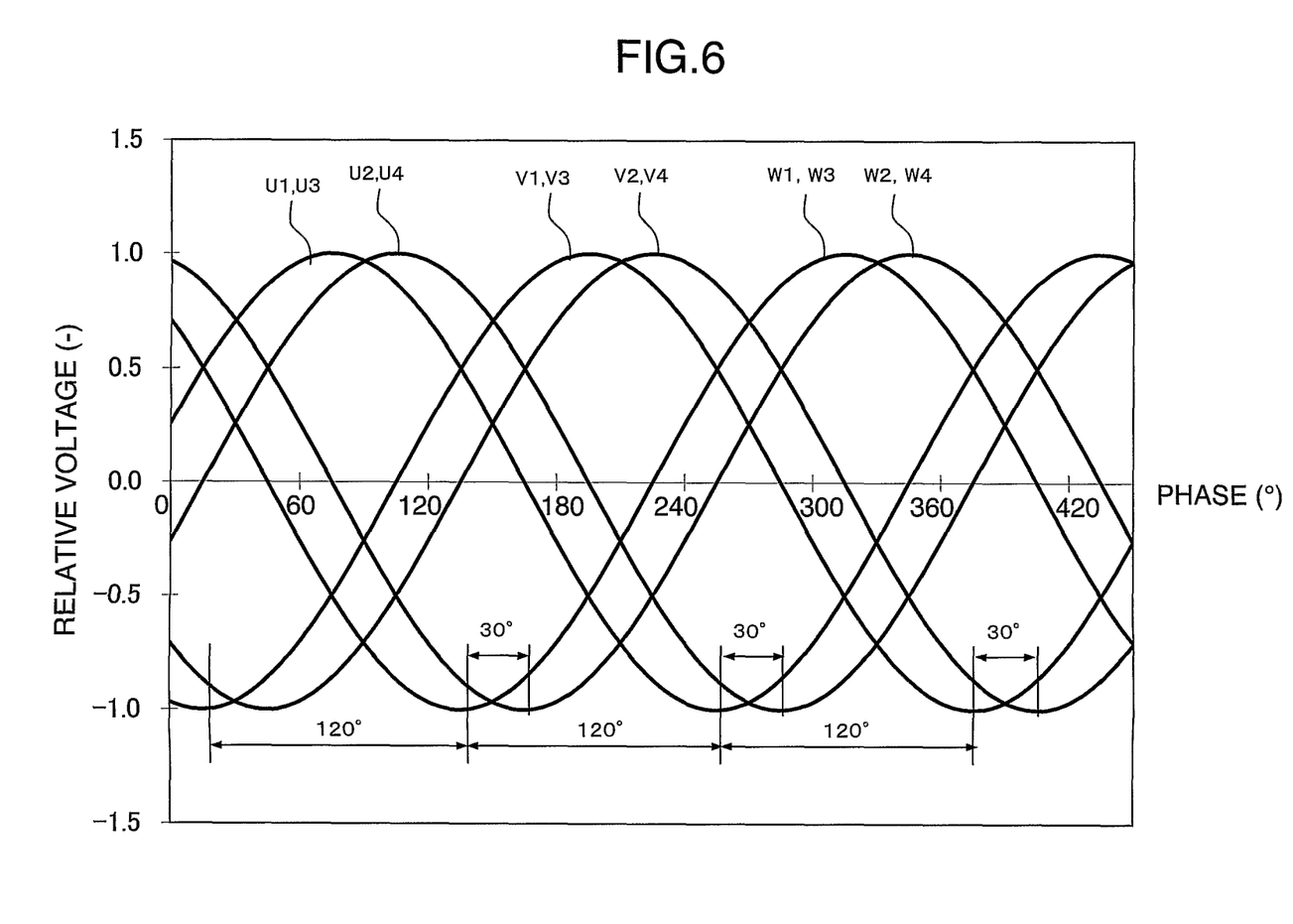
FIG. 6 is a graph illustrating the phases of the driving voltage of the second embodiment.

A second embodiment of the electric motor system is shown in FIG. 4 through FIG. 6. Because the structure of the second embodiment is identical in many respects to that of the first embodiment, explanations regarding the identically structured portions are omitted, and only those components of the second embodiment that are different from those in the first embodiment are described in any detail below.

FIG. 4 is a circuit diagram of the second embodiment of the electric motor system. In this embodiment, electric motor 10 has four three-phase coil sets 1A, 1B, 1C, and 1D, and a driving circuit 20 that produces four three-phase driving voltages (first three-phase driving voltages U1, V1, W1; second three-phase driving voltages U2, V2, W2; third three-phase driving voltages U3, V3, W3; and fourth three-phase driving voltages U4, V4, W4). Driving circuit 20 has, in addition to control units 63 and 64 from the first embodiment, third and fourth inverter units 53 and 54. In control units 61, 62, 63, and 64, the CPUs 611, 621, 631, and 641 perform mutually synchronized calculations to produce driving voltages with specific phase differences in inverter units 51 through 54. Note that CPUs 611, 621, 631, and 641 may be replaced with a single shared CPU to control units 61 through 64.

Third and fourth inverter units 53 and 54, structured identically to first and second inverter units 51 and 52, are each structured from six IGBTs, 531 through 536, and 541 through 546. Third inverter unit 53 drives three-phase driving voltages U3, V3, and W3. Similarly, fourth inverter unit 54 drives three-phase driving voltages U4, V4, and W4. As shown in FIG. 6, the third and fourth three-phase driving voltages, U3, V3, W4 and U4, V4, W4, have phases that are 120° different from each other. The third three-phase driving voltages U3, V3, and W3 are in the same phases as the first three-phase driving voltages U1, V1, and W1. Similarly, the fourth three-phase driving voltages U4, V4, and W4 are in the same phases as the second three-phase driving voltages U2, V2, and W2.

As shown in FIG. 4, electric motor 10, in addition to having two three-phase coil sets 1A and 1B, as in the first embodiment, is provided with third and fourth three-phase coil sets 1C and 1D. Third three-phase coil set 1C is structured from coils u3, u3', v3, v3', w3, and w3', and driving voltages U3, V3, and W3 are applied to these coils as shown. Similarly, fourth three-phase coil set 1D is structured from coils u4, u4', v4, v4', w4, and w4', and driving voltages U4, V4, and W4 are applied to these coils a shown.

FIG. 5 presents a cross-sectional diagram of electric motor 10. Electric motor 10 is a 28-pole, 24-slot surface permanent magnet electric motor. That is, 28 permanent magnets 110 are disposed with alternating polarities on the outer periphery of rotor 90, and 24 salient poles 120 are disposed at 15° intervals on the inner periphery of stator 80, protruding towards the rotational center of rotor 90.

As shown in FIG. 5, coils u1, u2', w1', w2, v1, v2', u1', u2, w1, w2', v1', v2, u3, u4', w3', w4, v3, v4', u3', u4, w3, w4', v3', and v4 are arranged clockwise along the stator, wrapped onto corresponding salient poles 120. Additionally, coils u1, v1, w1, u2, v2, w2, u3, v3, w3, u4, v4, and w4, have winding directions that are the same as each other, and opposite from coils u1', v1', w', u2', v2', w2', u3', v3', w3', u4', v4', and w4'. Because of this, the magnetic field vector that is generated in each of the aforementioned coil pairs (such as coils u1 and u1') are of opposite polarities relative to the center of rotation of rotor 90.

FIG. 6 illustrates the phases of the three-phase driving voltages in the second embodiment. In this figure, the horizontal axis shows the phases of the driving voltages and the vertical axis shows the driving voltages (the relative voltages). Driving voltages U3, V3, and W3 of third inverter unit 53 have phase differences of 0°, 120°, and 240°, respectively, when driving voltage U1 is used as the reference. Furthermore, driving voltages U4, V4, and W4 of fourth inverter unit 54 have phase differences of 30°, 150°, and 270°, respectively, when driving voltage U1 is used as the reference. Consequently, as shown in FIG. 6, driving voltages U1, V1, and W1, output from first inverter unit 51, and driving voltages U3, V3, and W3, output from third inverter unit 53, have substantially identical phases. Similarly, driving voltages U2, V2, and W2, output from second inverter unit 52, and driving voltages U4, V4, and W4, output from fourth inverter unit 54, have substantially identical phases. Driving voltages U3, V3, and W3, output from third inverter unit 53, and driving voltages U4, V4, and W4, output from fourth inverter unit 54, have respective phase differences of 30°. Adjacent coils that are supplied with electric currents having phase differences of 30° are wound in opposite directions.

Even in the 28-pole, 24-slot electric motor system configuration of the second embodiment, the electric angles of adjacent salient poles will differ from each other by 210° (28× 180°/24). That is, the phases of the magnetic fluxes formed by adjacent coils will differ from each other by 210°. As in the first embodiment, having two three-phase driving power supplies with a phase difference of 30° enables the electric angle between adjacent coils to be 210°. Similarly, synchronous driving of the 28-pole, 24-slot electric motor of the second embodiment is possible. The structure of the second embodiment has the same effects as the electric motor system of the first embodiment.

The first embodiment (a 14-pole, 12-slot electric motor), and the second embodiment (a 28-pole, 24-slot electric motor), are described as illustrative examples. Note that the first embodiment is a (14×1)-pole, (12×1)-slot electric motor, and the second embodiment is a (14×2)-pole, (12×2)-slot electric motor. The electric motor system is not limited to the previous examples, but rather, the same effects can be obtained in a (14×n)-pole, (12×n)-slot electric motor system (where n is a positive integer). Furthermore, the same effects can be obtained even in a (10×n)-pole, (12×n)-slot electric motor (where n is a positive integer).

Furthermore, while the presented embodiments are described as having a surface permanent magnet electric motor, the electric motor system disclosed is not limited thereto, but rather can be applied also to embedded magnet-type electric motors, and it should be noted that the same effects can be obtained therein.

The present invention contemplates that many changes and modifications may be made. Therefore, while a number of embodiments of the electric motor system have been shown and described, and a number of alternatives discussed, persons skilled in this art will readily appreciate that various additional changes and modifications may be made without departing from the nature of the invention, as defined and differentiated by the following claims.

The invention claimed is:

1. An electric motor system comprising:
   a rotor;
   a stator;
   said rotor and said stator being mounted for movement relative to one another;
   said rotor having multiple permanent magnet poles on an outer periphery of said rotor;
   said stator having multiple salient poles facing said permanent magnet poles;
   a first coil set and a second coil set;
   said first coil set having three phases, each of said phases comprising a first coil and a second coil connected in series and wrapped around different of said salient poles in different directions relative to said rotor;
   said second coil set having three phases, each of said phases comprising a first coil and a second coil connected in series and wrapped around different of said salient poles in different directions relative to said rotor;
   a driver configured to drive said first coil set with a first three-phase voltage and to drive said second coil set with a second three-phase voltage;
   said driver configured to drive said first phase of said first three-phase voltage and said first phase of said second three-phase voltage with a relative phase shift, and
   wherein at least two of said salient poles are adjacent and said adjacent salient poles have a relative magnetic flux phase shift approximately equal to said relative phase shift plus 180 degrees.

2. The electric motor system set forth in claim 1, wherein said phase shift is 30 degrees.

3. The electric motor system set forth in claim 1, wherein said coils are wrapped around adjacent salient poles and configured with said driver such that said adjacent salient poles have a relative magnetic flux phase shift of about 210 degrees.

4. An electric motor system as set forth in claim 1, wherein the number of permanent magnet poles is 14×n and the number of salient poles is 12×n, where n is a positive integer.

5. An electric motor system as set forth in claim 4, wherein n is 1.

6. An electric motor system as set forth in claim 4, wherein n is 2 and further comprising a third coil set and a fourth coil set.

7. An electric motor system as set forth in claim 1, wherein the number of permanent magnet poles is 10×n and the number of salient poles is 12×n, where n is a positive integer.

8. An electric motor system as set forth in claim 1, wherein said rotor comprises a surface and said magnetic poles are formed on said surface of said rotor.

9. An electric motor system as set forth in claim 1, wherein said magnetic poles are embedded in said rotor.

10. An electric motor system as set forth in claim 1, wherein said first coil set and said second coil set are connected to said driver independently of each other.

11. An electric motor system as set forth in claim 1, wherein said stator and said rotor are mounted for rotational movement relative to one another about a common axis.

12. An electric motor system as set forth in claim 1, wherein said driver comprises a plurality of switching elements.

13. An electric motor system as set forth in claim 12, wherein said plurality of switching elements comprises a plurality of insulated gate bipolar transistors (IGBT).

14. An electric motor system as set forth in claim 1, wherein said driver comprises an AC to DC inverter.

15. An electric motor system as set forth in claim 1, wherein said driver is configured to operate using pulse-width-modulation.

16. An electric motor system as set forth in claim 1, wherein said driver comprises an AC to DC rectifier, a rectifying capacitor, a CPU, a pulse-width-modulation module, a gate driver, and a plurality of insulated gate bipolar transistors.

17. An electric motor system as set forth in claim 16, and further comprising a current sensor arranged to measure a current flow in an output line of said driver.

18. An electric motor system as set forth in claim 17, wherein said current sensor is in communication with said CPU.

19. An electric motor system as set forth in claim 1, wherein said driver comprises six IGBTs arranged to produce said first three-phase voltage.

* * * * *